(12) United States Patent
Hassett et al.

(10) Patent No.: US 7,569,955 B2
(45) Date of Patent: Aug. 4, 2009

(54) ELECTRIC MOTOR WITH HEAT PIPES

(75) Inventors: Timothy Hassett, Santa Rosa, CA (US); Mark Hodowanec, Leesburg, VA (US)

(73) Assignee: Thermal Motor Innovations, LLC, Leesburg, VA (US)

(*) Notice: Subject to any disclaimer, the term of this patent is extended or adjusted under 35 U.S.C. 154(b) by 0 days.

(21) Appl. No.: 11/765,140

(22) Filed: Jun. 19, 2007

(65) Prior Publication Data

US 2008/0023177 A1 Jan. 31, 2008

Related U.S. Application Data

(60) Provisional application No. 60/805,192, filed on Jun. 19, 2006.

(51) Int. Cl.
*H02K 9/22* (2006.01)
*H02K 9/08* (2006.01)
*H02K 1/32* (2006.01)

(52) U.S. Cl. .................. 310/54; 310/52; 310/57; 310/64; 310/88; 310/254; 310/261

(58) Field of Classification Search ............... 310/25, 310/54, 57, 60 R–63, 64, 88, 216, 254, 261
See application file for complete search history.

(56) References Cited

U.S. PATENT DOCUMENTS

| | | | |
|---|---|---|---|
| 2,556,435 A | 6/1951 | Moehrl et al. | |
| 3,715,610 A | 2/1973 | Brinkman | |
| 3,765,480 A | 10/1973 | Fries | |
| 3,801,843 A | 4/1974 | Corman et al. | |
| 4,118,646 A | 10/1978 | Fleming et al. | |
| 4,217,513 A | 8/1980 | Kohzai et al. | |
| 4,270,064 A | 5/1981 | Glandorf et al. | |
| 4,322,646 A | 3/1982 | Persson | |
| 4,406,959 A | 9/1983 | Harano et al. | |
| 4,574,210 A | 3/1986 | Wieland | |
| 4,685,867 A | 8/1987 | Patun et al. | |
| 4,745,320 A | 5/1988 | Oyama et al. | |
| 5,140,204 A | 8/1992 | Cashmore et al. | |

(Continued)

FOREIGN PATENT DOCUMENTS

GB 1489772 A * 10/1977

(Continued)

*Primary Examiner*—Quyen Leung
*Assistant Examiner*—David W. Scheuermann
(74) *Attorney, Agent, or Firm*—Polster, Lieder, Woodruff & Lucchesi, L.C

(57) ABSTRACT

An electric motor including a motor portion, a cooling portion and a plurality of heat pipes is provided. The motor portion includes a stator and a rotor that when energized with electric current causes the rotor to rotate. The motor portion comprises a motor frame that encloses the rotor and stator from exterior elements. The cooling portion is adjacent the motor portion and exterior of the motor portion. In various embodiments it defines a fluid chamber containing a quantity of fluid that is prevented from contacting interior of the motor portion. The plurality of heat pipes within the motor portion extend from the motor portion to the cooling portion such that the fluid contacts the heat pipe within the cooling portion in order to remove heat from the heat pipe.

59 Claims, 12 Drawing Sheets

U.S. PATENT DOCUMENTS

| | | |
|---|---|---|
| 5,220,978 A | 6/1993 | McMaster |
| 5,223,757 A | 6/1993 | Staub et al. |
| 5,394,040 A | 2/1995 | Khanh |
| 5,552,988 A | 9/1996 | Kawaguchi et al. |
| 5,808,387 A | 9/1998 | Akachi et al. |
| 5,925,947 A | 7/1999 | Kajiwara et al. |
| 6,252,937 B1 * | 6/2001 | Snyder ............ 378/141 |
| 6,339,269 B1 | 1/2002 | Hsiao |
| 6,384,507 B1 | 5/2002 | Lee et al. |
| 6,499,532 B1 | 12/2002 | Williams |
| 6,509,665 B1 | 1/2003 | Nishiyama et al. |
| 6,528,909 B1 | 3/2003 | Kan et al. |
| 6,943,467 B2 | 9/2005 | Potoradi et al. |
| 2006/0001269 A1 | 1/2006 | Jansen et al. |
| 2006/0066155 A1 | 3/2006 | Matin et al. |
| 2006/0017335 A1 | 4/2006 | Martin et al. |

FOREIGN PATENT DOCUMENTS

| | | |
|---|---|---|
| JP | 05207704 | 8/1993 |
| JP | 09246056 A * | 9/1997 |

* cited by examiner

ELECTRIC MOTOR WITH HEAT PIPES

The present disclosure claims priority to U.S. Provisional Application Ser. No. 60/805,192, filed Jun. 19, 2006, the contents of which are incorporated herein by reference.

FIELD

The present disclosure relates to electric motors. More specifically, the present disclosure relates to an electric motor having at least one heat pipe installed therein to assist in cooling of the motor.

BACKGROUND

Electric motors are used for a multitude of tasks and frequently those motors are used in applications where cooling of the motor is difficult. Commonly, these hard-to-cool applications involve large motors. One example of a hard-to-cool application is a motor powering a dry-pit submersible or an explosion-proof submersible motor. Many other hard-to-cool applications exist and the present disclosure is not limited to submersible motors. In the past these hard-to-cool applications utilized motors that were oversized for the application or placed in an enclosure that did not offer as much protection as a totally enclosed motor. These oversized motors are more expensive to purchase.

Heat pipes are also generally known. Heat pipes, generally, are a heat transfer mechanism that can transport large quantities of heat with a very small difference in temperature between hot and cold interfaces. A typical heat pipe consists of sealed hollow tube made of a thermoconductive metal such as copper or aluminum. The pipe contains a relatively small quantity of a "working fluid" or coolant (such as water, ethanol or mercury) with the remainder of the pipe being filled with vapor phase of the working fluid, all other gases being excluded. Internally, in order to overcome gravitational forces (or because of their absence in the case of space applications) most heat pipes contain a wick structure. This typically consists of metal powder sintered onto the inside walls of the tube, but may in principle be any material capable of soaking up the coolant.

SUMMARY

An electric motor including a motor portion, a cooling portion and a plurality of heat pipes is provided. The motor portion includes a stator and a rotor that when energized with electric current causes the rotor to rotate. The motor portion comprises a motor frame that encloses the rotor and stator from exterior elements. The cooling portion is adjacent the motor portion and exterior of the motor portion. It defines a fluid chamber containing a quantity of fluid that is prevented from contacting interior of the motor portion. The plurality of heat pipes within the motor portion extend from the motor portion to the cooling portion such that the fluid contacts the heat pipe within the cooling portion in order to remove heat from the heat pipe.

DETAILED DESCRIPTION

Figure 1:
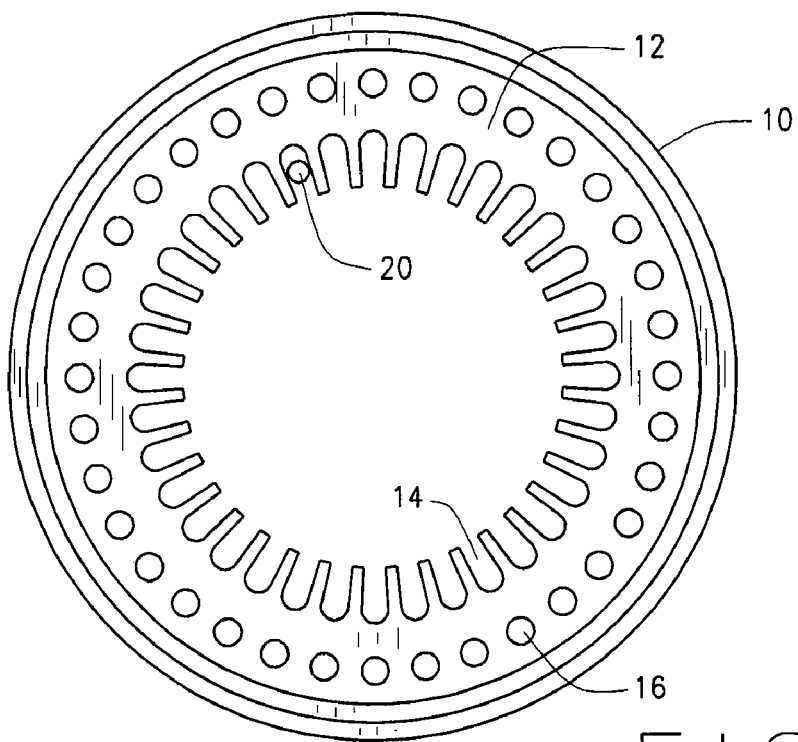
FIG. 1 is a cross-sectional view of a stator core and frame of a motor according to an embodiment of the present disclosure.

While this disclosure is susceptible of embodiment in many different forms, there is shown in the drawings and will herein be described in detail various embodiments of the disclosure with the understanding that the present disclosure is to be considered as an exemplification of the principles of the disclosure and is not intended to limit the broad aspect of the disclosure to the embodiments illustrated.

Various embodiments of the present disclosure comprise a totally enclosed motor having one or more heat pipes installed in order to increase cooling capability of the motor. The inventive motor is particularly adapted to applications where cooling is problematic. A motor made according to the present disclosure allows smaller, more efficient motors to be implemented where previously not possible. The present disclosure allows for higher continuous power density. While the various embodiments are primarily shown and described with respect to a distributed winding induction motor, the present disclosure may be implemented in other types of motors without departing from the scope of the present disclosure. By way of example and not limitation, various motor types (e.g. induction, synchronous, permanent magnet, and dc), various rotor types (fabricated copper bar, aluminum die cast, permanent magnet, and wound rotor), motor cooling methods (Totally Enclosed Fan Cooled (TEFC), submersible, hermetic, Totally Enclosed Pipe Ventilated (TEPV), Totally Enclosed Water Cooled (TEWC)) may be used although not shown in the various embodiments as one of ordinary skill in the art would recognize.

As used throughout this application, the term fluid should be defined to include a liquid or a gas. Various different liquids and liquid combinations could be used, such as water or water mixed with an alcohol, for example, or oil, and various gases could be used, such as pure gases or gas combinations, such as air.

What is described below is the use of heat pipes in an electric motor. In one embodiment heat pipes are incorporated into the stator slot to directly cool the windings. Most of the heat in an electric motor is generated in the motor winding. Thus, putting the heat pipe in close proximity to the copper winding will make the heat transfer most efficient there. The heat pipes may also be implemented in the core/laminations of the stator. While less so than the windings, heat is generated in the core. In addition, the heat conduction path from the windings thru the core is shorter and involves one less interface (as compared to heat pipes in the frame or back iron ring). Heat pipes may also be implemented in the frame. The heat pipes in the frame absorb heat that is generated in the winding and the core. The conduction path is longer, and an additional interface (the core to frame interface) is encountered. This reduces the efficiency of the heat transfer. However, it will still be superior to the heat transfer efficiency as compared to a traditional TEFC or TEWC motors commonly used in industry. Heat pipes may be implemented also in the back iron ring. The same arguments apply here as in the heat pipes in the frame. A disadvantage here is that an additional part, the back iron ring (BIR), is required. An advantage is that a manufacturer's standard laminations and frames can be used.

Heat pipes may also be implemented in the rotor. Longer rotor bars are used and extend beyond the end connector. These extensions cool the bars as they circulate in the air. Rotor efficiency is related to rotor resistance. The resistance itself is a function of rotor bar temperature. If the bar operating temperature drops, then the resistance drops, with subsequent increase in efficiency. Moreover, across the line starting causes severe rotor heating. The number of permissible starts for a large induction motor is related to how much heat the rotor bars can absorb. With heat pipes in the rotor bars, the heat is moved so rapidly from the bars that the rotor bars have a higher effective heat capacity. This in turn increases the number of hot starts that the motor can be subjected to. The heat pipes may be implemented, such as for example fabricated or cast induction rotors, solid (bar-less) rotors, stacked lamination rotors, wound rotors, including induction, synchronous, DC rotors, and permanent magnet rotors.

In addition to where a heat absorbing end of a heat pipe is placed in a motor to absorb heat ("the evaporator end"), where the other end of the heat pipe is placed to reject heat ("the condensing end") is important. In accordance with various embodiments, in submersible motors commonly known to drive a pump operable to pump, or move, a fluid and be coupled to a mounting plate of the motor, the condensing end of the heat pipe may be placed in an oil filled cooling chamber, sometimes referred to as an oil chamber, associated with the motor to rejected heat to oil within the oil chamber. The oil is, in turn, cooled by the mounting plate. Particularly, the mounting plate is an integral part of the submersible motor and serves two functions: it closes off the bottom of the oil chamber and provides for means of mounting the pump directly on the motor (which is commonly the practice on submersible motors). Accordingly, in such embodiments, the mounting plate may be considered to be an 'infinite cold plate' because it stays at a substantially constant temperature as a result of the pumping of a high volume of fluid, at relatively cool temperatures, through the pump, wherein the fluid being pumped contacts and cools the mounting plate as it is propelled through the pump. Consequently, the oil in the oil chamber is cooled by contacting the constant temperature mounting plate.

In water cooled motor embodiments of the present disclosure, the condenser end of the heat pipe is cooled by a cooling head—a water cooler which surrounds the condenser end. In addition to more efficient heat extraction, there are additional advantages. For instance, the cooling portion of the motor (i.e. the 'wet head') does not have to surround the frame itself, which is commonly done on totally enclosed water cooled (TEWC) machines. Likewise elaborate air circulation throughout internal motor components and then through a water-to-air heat exchanger is also not required. Also, leaks are contained to the cooling head. In addition, the cooling head to can be switched from a 'wet head' to an 'air head' if cooling water is no longer available.

In air cooled motor embodiments of the present disclosure, the condenser end of the heat pipe is cooled by 'air head' cooling head—an air heat exchanger which extracts heat from the condenser end of the heat pipes to fins to the cooling air that blows over the fins. In addition to more efficient heat extraction (as a result of where the heat pipes pick up the heat from the winding and stator), there are additional advantages. For instance, the air can be easily routed thru the heat exchanger like in a pipe ventilated motor. This easy air routing is not possible with current TEFC motors. In addition, the cooling head to can be switched from an 'air head' to a 'wet head'.

In hermetic motors, the condenser end of the heat pipe is cooled by evaporative cooling of cooling media, e.g., Freon. This is much the same as the way that coil end turns and the core are directly cooled in current hermetic motors. However, in various embodiments, it is possible to extract heat from the windings within the core as efficiently without directly exposing sensitive internal motor components to the harsh chemicals of the cooling media and environmental conditions which current technology hermetic motors do. In the present disclosure, the motor does not have to be hermetically sealed. The cooling portion (which is separate from the motor enclosure portion) can be independently hermetically sealed and cooled.

Figure 2:
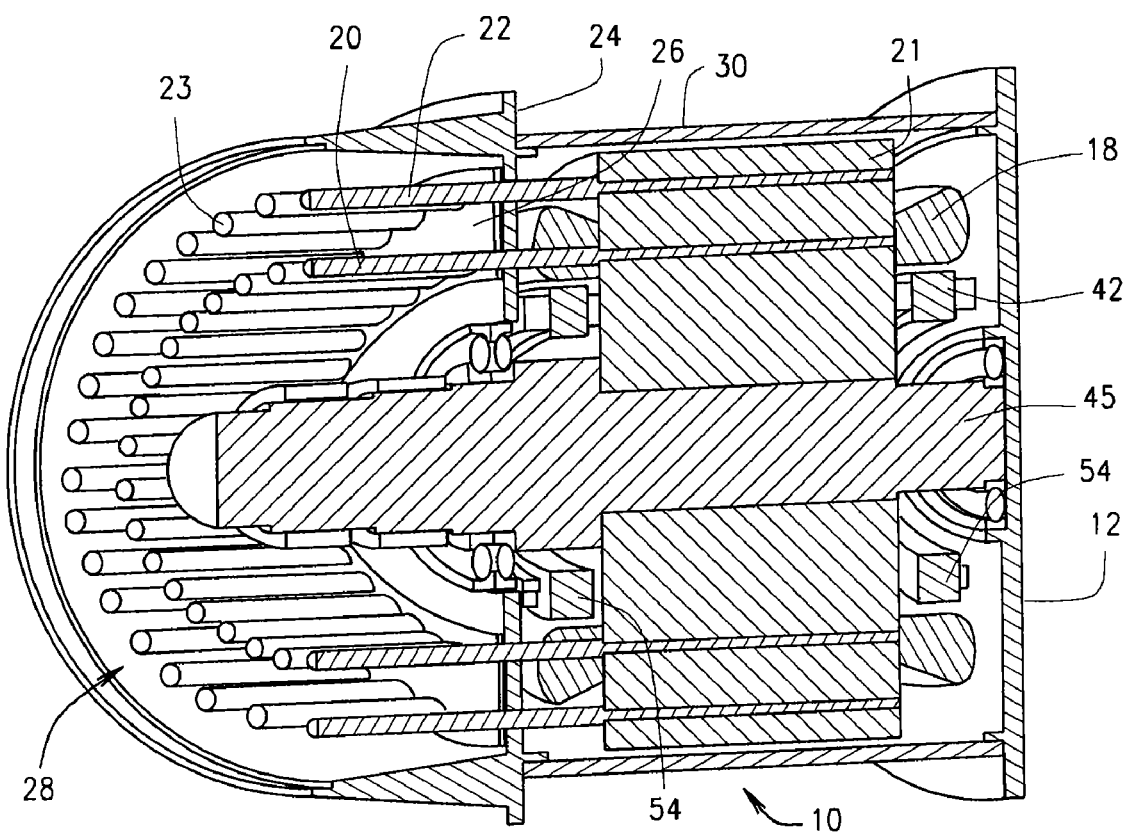
FIG. 2 is a perspective, cross-sectional view of a motor according to an embodiment of the present disclosure.

In that regard and referring to FIGS. 1 and 2, there is shown the stator core 12 of an electric motor 10. The motor 10 is shown in partial view, and in FIG. 1 without its windings, for clarity of display. The stator core 12 comprises laminations of electrical steel that form a plurality of slots 14 and bores 16 that are radially spaced about the stator core 12. As with conventional electric motors, the slots 14 are wound with a stator winding 18. In various embodiments, heat pipes 20 are inserted in each slot 14 of the motor with the stator winding 18. Moreover, heat pipes 22 are placed within each bore 16 of the stator core 12.

Figure 3:
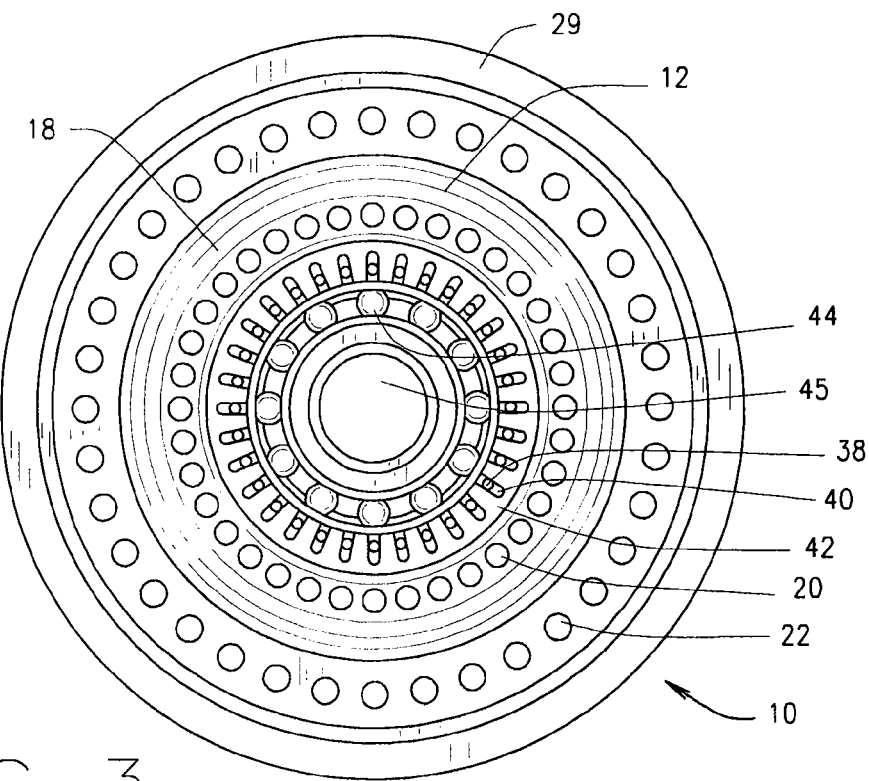
FIG. 3 is an end view of a motor according to an embodiment of the present disclosure.
Figure 4:
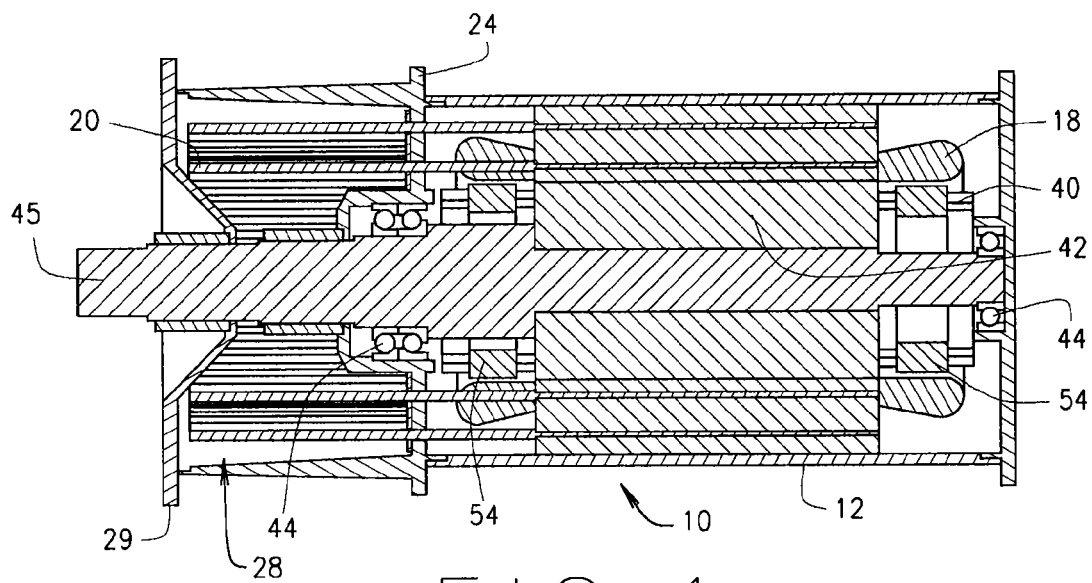
FIG. 4 is a cross-sectional side view of a motor according to an embodiment of the present disclosure.

Referring to FIGS. 2-4, the heat pipes 20 and 22 extend through a drive end bearing housing 24 and a heat pipe clamp plate 26 of the motor 10 and into a cooling chamber 28 that can be filled with oil or other cooling fluid. The oil acts as a heat sink and transfers the heat to a mounting plate 29. A pump (not shown), driven by the motor 10 and operable to pump, or move, a fluid is mounted directly to the mounting plate 29. The pump is cooled by the fluid (pump medium) that it is pumping. In addition, some of the pumped fluid (pump medium) is directly in contact with the mounting plate 29. Therefore, the fluid (pump medium) cools the pump as well as the mounting plate 29. The mounting plate 29 in turn cools the oil, the oil cools condenser ends 23 of the heat pipes 20 and 22, and the heat pipes 20 and 22 cool the stator core 12 and winding 18, as described herein. As a result, the heat pipes 20 and 22 increase the capacity of heat dissipation. Accordingly, the heat pipes 20 and 22 in the stator core 12 and stator winding 18 move the heat generated in the stator core 12 and stator winding 18 to the oil in the cooling chamber 28. The oil is dielectric, so that submersible motor moisture probes, in submersible pump applications, can properly function.

With the heat pipes 20 and 22 thus inserted, top ends 21 of the heat pipes 20 and 22 that are in the stator core 12 and stator winding 18 serve as an evaporator portion of the heat pipes 20 and 22. Bottom ends 23 of the heat pipes 20 and 22 serve as the condenser ends of the heat pipes 20 or 22. The oil within the cooling chamber 28 is kept cooled by conduction, convection and radiation of heat from the exterior surface of the cooling chamber 28. More particularly, when the motor 10 is used to drive or operate a fluid pump, the fluid moving through the pump (pump medium) acts as a coolant that cools the mounting plate 29, which provides an essentially constant temperature heat sink that cools the oil within the cooling chamber 28. Consequently, the cooled oil within the cooling chamber 28 cools the condenser ends 23 of the heat pipes 20 and 22.

Figure 5:
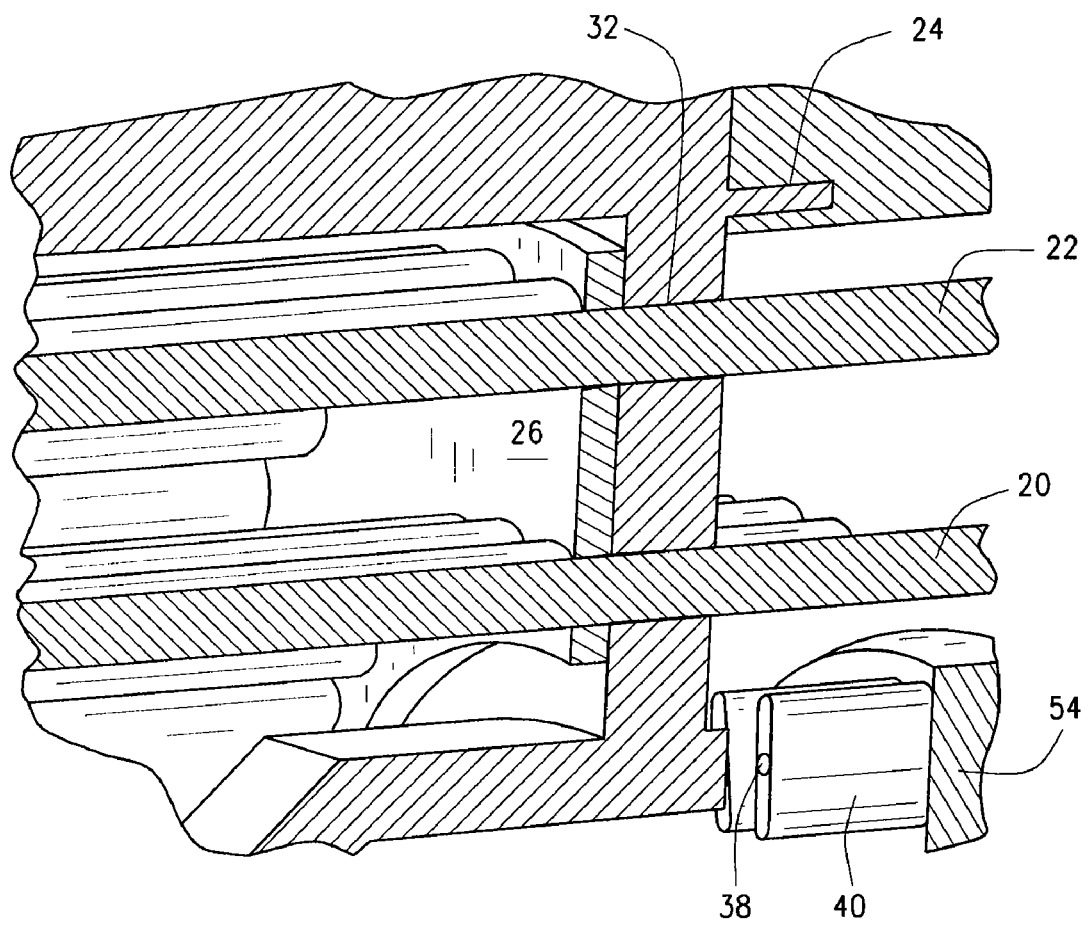
FIG. 5 is an enlarged, perspective cross-sectional view of a motor according to an embodiment of the present disclosure.

FIG. 5 shows the sealing arrangement between the drive end bearing housing 24 and the clamping plate 26, in accordance with various embodiments. The drive end bearing housing 24 includes a plurality of bores 32 through which the heat pipes 20 and 22 extend into the cooling chamber 28. Counterbores are formed on the cooling chamber 28 side of the drive end bearing housing 24 which contain o-rings (not shown). The o-rings within the counterbore are compressed slightly by the clamping plate 26 after the clamping plate is installed over the heat pipes 20 and 22 in order to seal the heat pipes 20 and 22 and prevent oil from escaping the cooling chamber 28.

Figure 6:
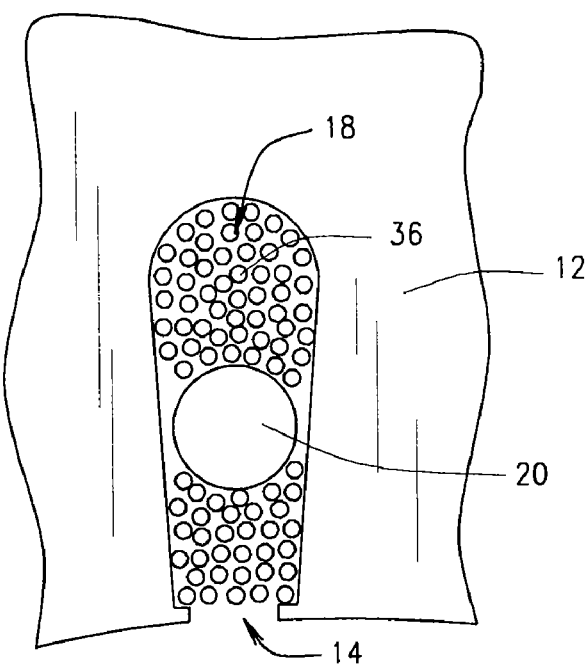
FIG. 6 is a close up cross sectional view of wound stator with a heat pipe inserted in center of the winding according to an embodiment of the present disclosure.

Shown in FIG. 6, the wire 36 of the stator core winding 18 is in close proximity to the heat pipe 20 in order to dissipate heat from the stator core winding 18. In the manufacturing process the heat pipe will be located in a position chosen for manufacturing ease and thermal efficiency. This can be at the top of the slot, center of the slot or end of the slot. The heat pipe 20 is shown centrally located within the slot 14 by first winding the stator slot 14 to a depth of roughly half the depth of the slot 14 minus half of the diameter of the heat pipe 20. The heat pipe 20 is then inserted into the slot 14 and the remaining wire 36 of the stator winding 18 is wound within the slot 14. While noting that the heat pipe 20 is shown as having a diameter of less than the width of the slot 14, it is within the scope of the present disclosure to comprise a heat pipe 20 that fits snugly or with a small interference fit within the slot 14 of the stator 12. While the present disclosure is illustrated with respect to a random wound stator, it should be apparent to one of ordinary skill in the art that the other winding techniques such as form wound coils may be used without departing from the scope of the present disclosure. The heat pipe 20 may also be located within the top or bottom of the slot 14 without departing from the scope of the present disclosure.

The heat pipes 22 of the stator core 12 also extend into the oil of the cooling chamber 28 and dissipate heat from the outer diameter of the stator core 12.

The above-described stator core of FIG. 6 and windings 12 and 18 of the present disclosure comprise an integral piece and represent a first option for forming the stator core 12. The first option consists of using a stator core 12 with the particular standard frame size but having slot geometry one frame size smaller and a stator outside diameter of one size larger standard frame size. In this manner, minimal tooling change is required from presenting existing tooling. However, this method will use significantly more electrical steel due to the increased size of the stator core 12 and thus is more expensive. Finally, the heat pipe bores 16 must be punched or machined into the stator core 12.

Figure 7:
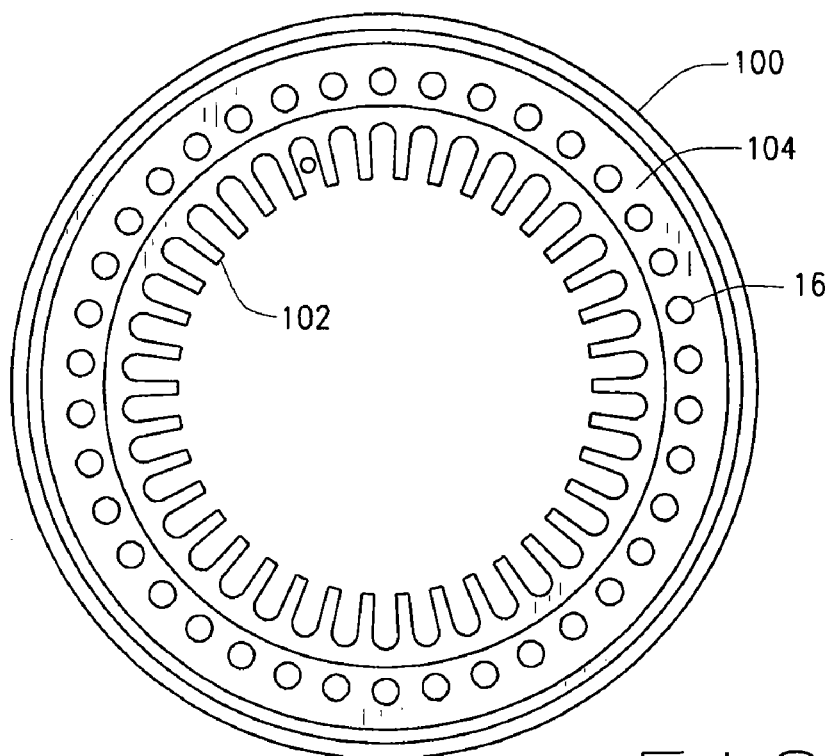
FIG. 7 is an end view of a stator core and frame of a motor according to another embodiment of the present disclosure.

The second option, shown in FIG. 7, is to use a one larger particular standard frame size outer frame 100 or "mechanical package," one smaller standard frame size inner stator core 102 or "electrical package" and a back iron ring 104. The back iron ring is designed to make up the difference in the outer diameter of the stator core 102 and the inner diameter of the outer frame 100. For example, if the outer frame 100 was for a 440 standard frame size and the inner stator core was for a 400 standard frame size stator, the back iron ring would be approximately 1.25 inches thick. It would thereby bridge the gap between a 17.5-inch stator outside diameter of a 400 standard frame size motor and the 20-inch inside diameter of a 440 standard frame size motor. The heat pipe holes 16 would be bored or gun drilled in the back iron ring 104.

Figure 8:
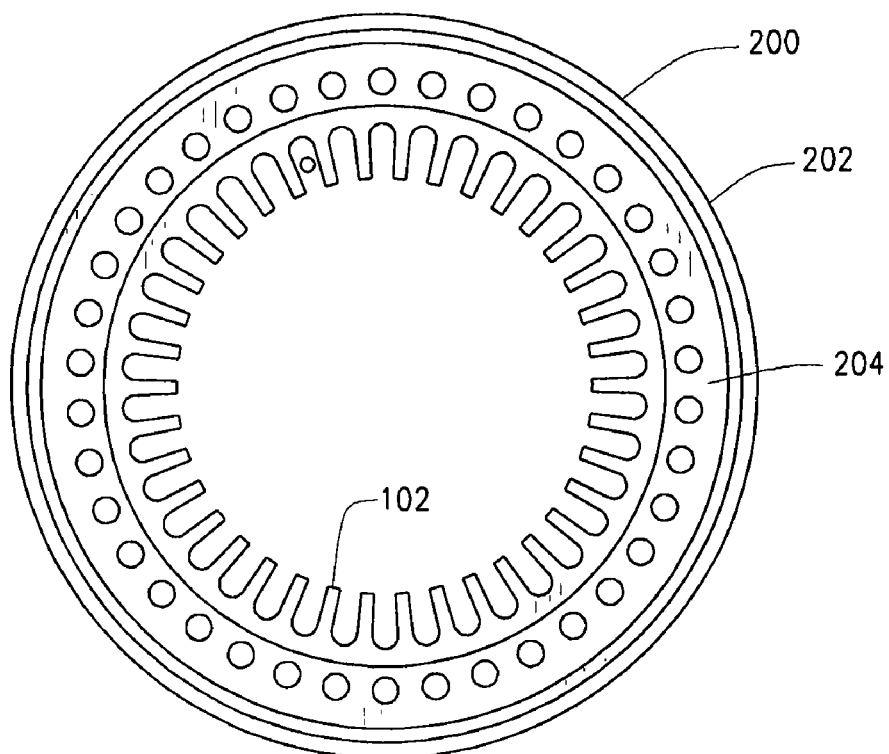
FIG. 8 is an end view of a stator core and frame of a motor according to another embodiment of the present disclosure.

Referring to FIG. 8, a third option is to integrally cast or fabricate a special frame 200. This frame 200 integrates the back iron ring 104 of the second option into an outer frame 202, and does not require an additional part of the back iron ring 104. This frame 200 has the outer sizings of a particular size frame (440, for example), but is cast to accommodate a stator of one smaller standard motor size (400, for example). The option requires a new casting pattern for the frame (if the frame is cast), but has the advantage of using standard electrical components and takes advantage of casting cheaper cast iron to take up the gap between the outer frame and the stator core 204 instead of using more expensive electrical steel or an additional back iron ring. The heat pipe holes 16 would be bored or drilled in the frame when the frame is machined.

Referring to FIG. 6, the stator winding 18 is wound in a slot 14 of the stator core 12 and about the heat pipe 20. In that regard, the winding 18 is first wound to half of the depth of the slot 14 in the stator core 12 minus half the diameter of the heat pipe 20. The heat pipe 20 is then inserted, and the stator winding 18 is continued over the heat pipe 20. By reducing the operating temperature of the stator winding 18, the amount of current the stator winding 18 can carry is effectively increased and the resistance of the stator winding 18 is similarly reduced with subsequent increase in efficiency.

Figure 9:
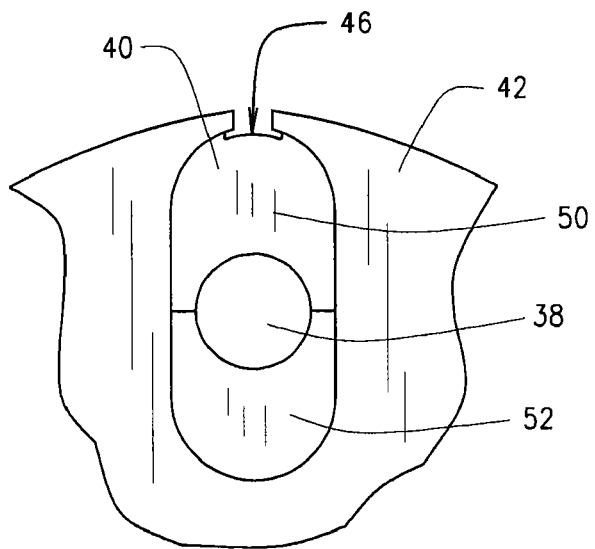
FIG. 9 is an enlarged view of a heat pipe installed in a rotor bar according to an embodiment of the present disclosure.
Figure 10:
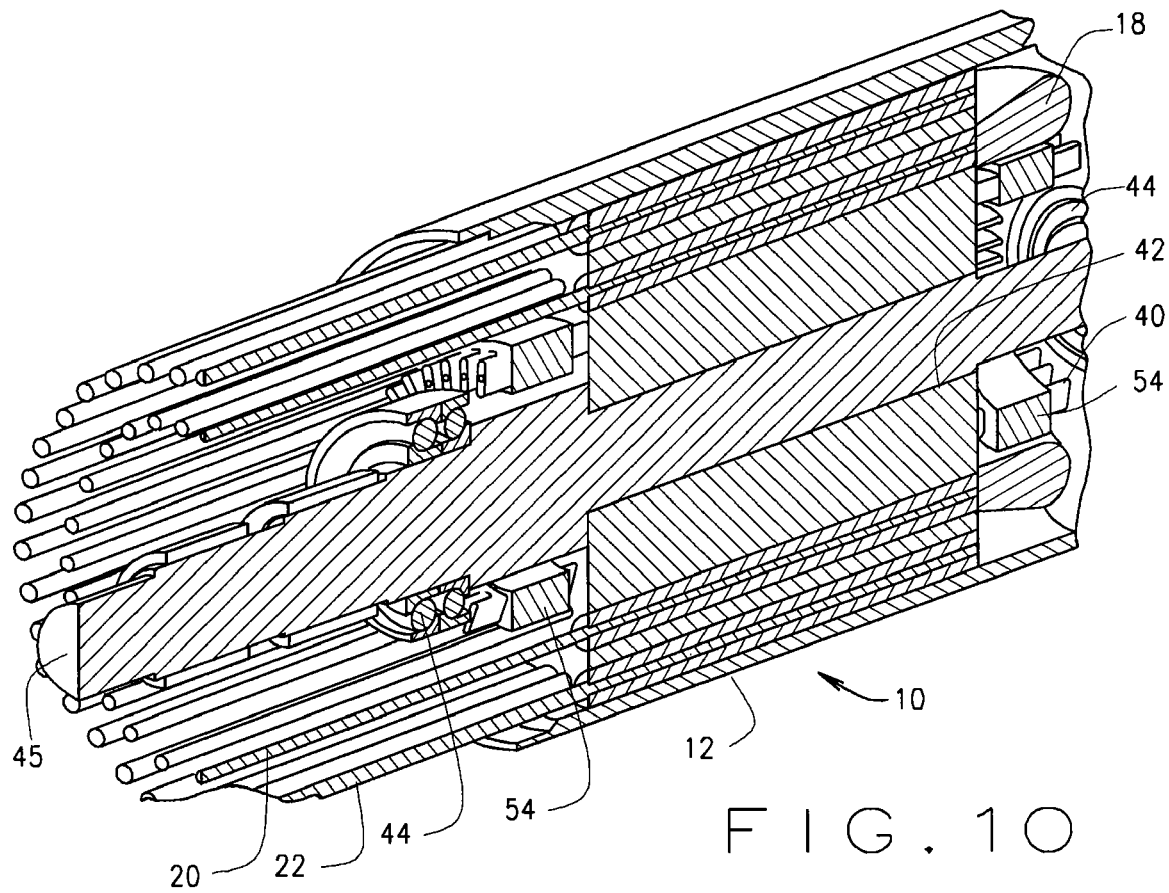
FIG. 10 is a perspective cross-sectional view of a motor according to an embodiment of the present disclosure.

Heat pipes may similarly be inserted into the rotor to assist in dissipating heat. Specifically, referring back to FIGS. 2-5, heat pipes 38 can be inserted into rotor bars 40 of a rotor 42 of the motor 10. The rotor 42, of course, is mounted on the shaft 45 which rotates within the stator 12 on bearings 44. As shown in FIGS. 9 and 10, the rotor 42 is punched with a cavity 46 therein for accepting a rotor bar 40. In various embodiments, the rotor bar 40 comprises two halves 50 and 52 which envelope the heat pipe 38 within the rotor 42. While splitting the rotor bar in two halves is desirable for ease of installation of a heat pipe 22, the rotor bar 40 can comprise a single, integral rotor bar 40 and the heat pipe 38 inserted on top or below the rotor bar 40 without departing from the scope of the present disclosure. Moreover, while the heat pipe may be installed in the rotor bar, it may also be installed additionally or exclusively within the rotor core.

Figure 11:
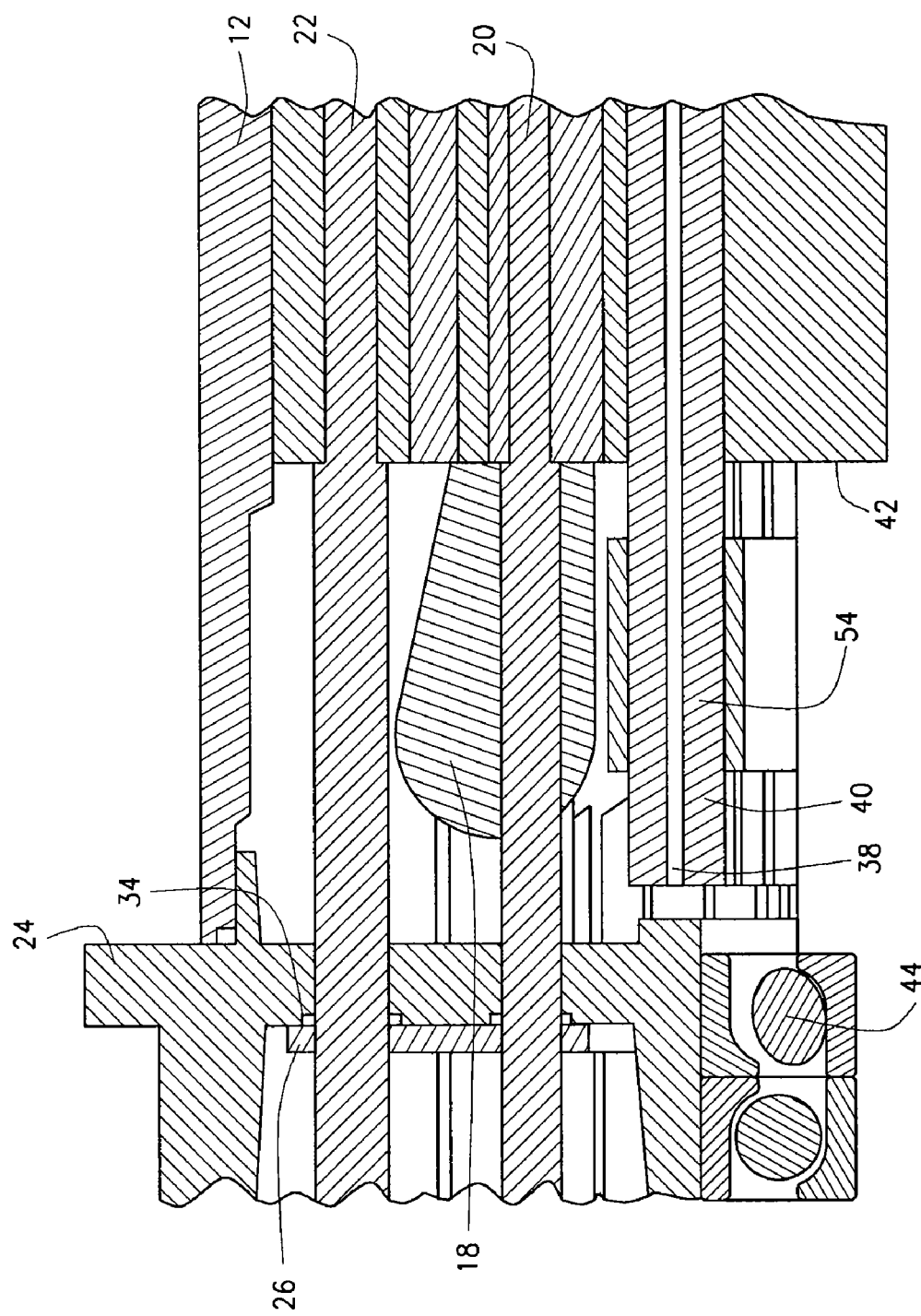
FIG. 11 is an enlarged partial view of a motor having heat pipes installed therein according to an embodiment of the present disclosure.

Referring to FIGS. 10 and 11, the rotor bars 40 extend beyond the rotor 42 into an air pocket formed between the rotor 42 and the end plate (not shown in FIG. 10) to essentially form a fan. The fan cools the exposed ends of the rotor bars 40 and heat pipes 38 as the rotor 42 rotates. An end connector ring 54 is further disposed on the extended portion of the rotor bars 40 and the heat pipes 38. A benefit of the end connector ring 54 is that it serves as a heat sink for the rotor bars 40. Cooling the rotor bars 40 and end connector ring results in a more efficient rotor. Allowing the end connector to serve as an additional heat sink for the rotor bars 40 increases how much heat the rotor bars 40 themselves can absorb, which in turn increases the number of hot, e.g. successive, starts, or amount of time in a stalled condition that the rotor can be subjected to.

As discussed, the heat pipes 38 in the rotor bars 40 move the heat generated in the rotor bars 40. In various embodiments, the heat pipes each comprise an evaporator portion and a condenser portion.

Moreover, the heat pipes 20, 22 and 38 are heated initially as part of the manufacturing process such that the pressure within the heat pipe 20, 22 and 38 causes it to expand. The heating is sufficient such that it causes the heat pipe to yield and expand. This does two things. It mechanically secures the heat pipe 20, 22 and 38 to the stator core 12 or rotor 42, as the case may be, and increases the degree of thermal contact between the stator core 12 or rotor 42 and the heat pipe 20, 22 and 38. The heat pipe may alternatively be pressed into position in a vertical or horizontal motor frame with the heat pipes now extending out and through the opposite drive end bracket or held in position by a fastening method such as epoxy, solder or braze. Each heat pipe can still be individually "O" ring sealed through the opposite drive end bracket using the same counter bore process as described above.

Figure 12:
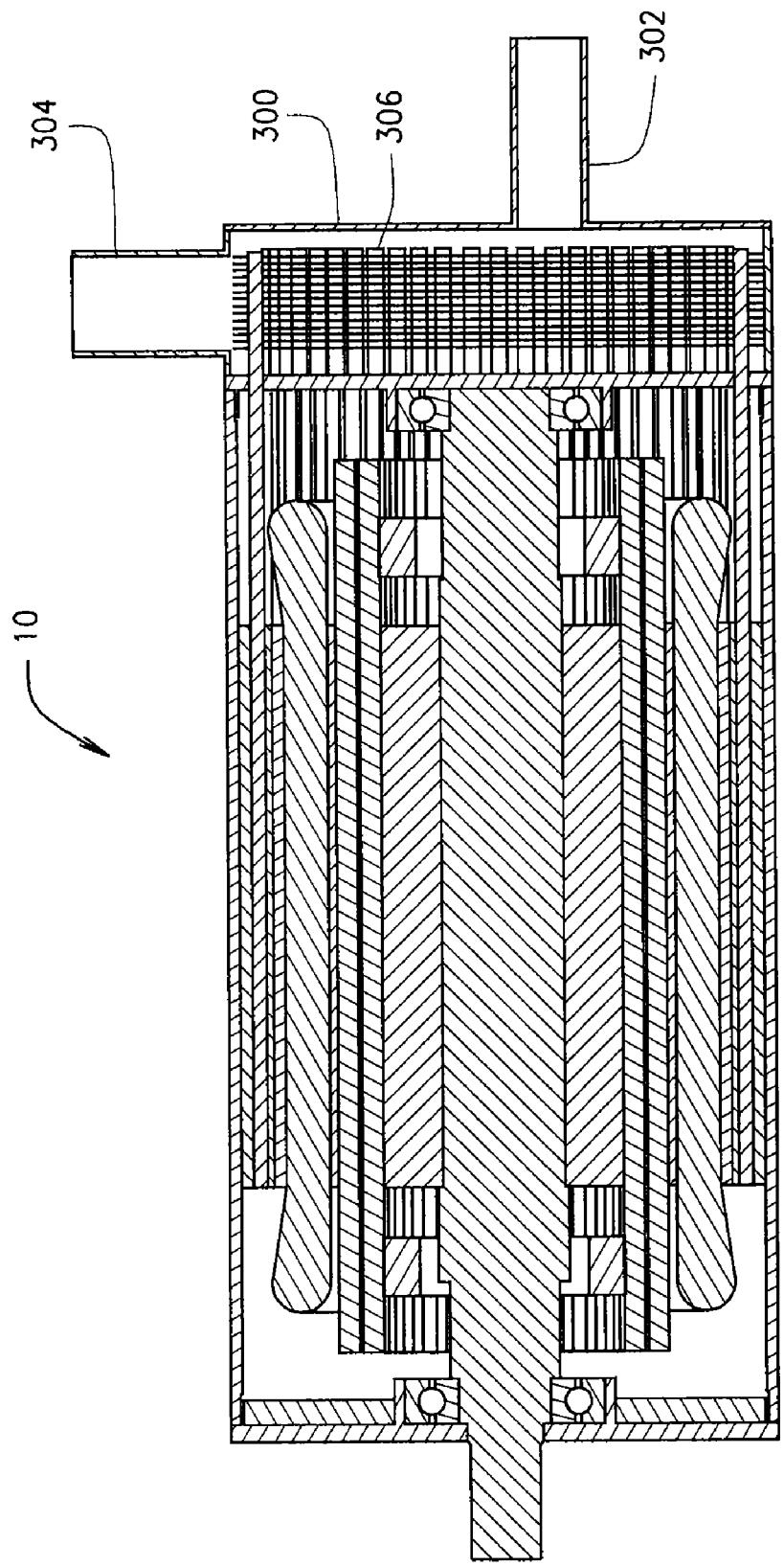
FIG. 12 is a side cross-sectional view of a motor having heat pipes cooled by ducted air according to an embodiment of the present disclosure.
Figure 13:
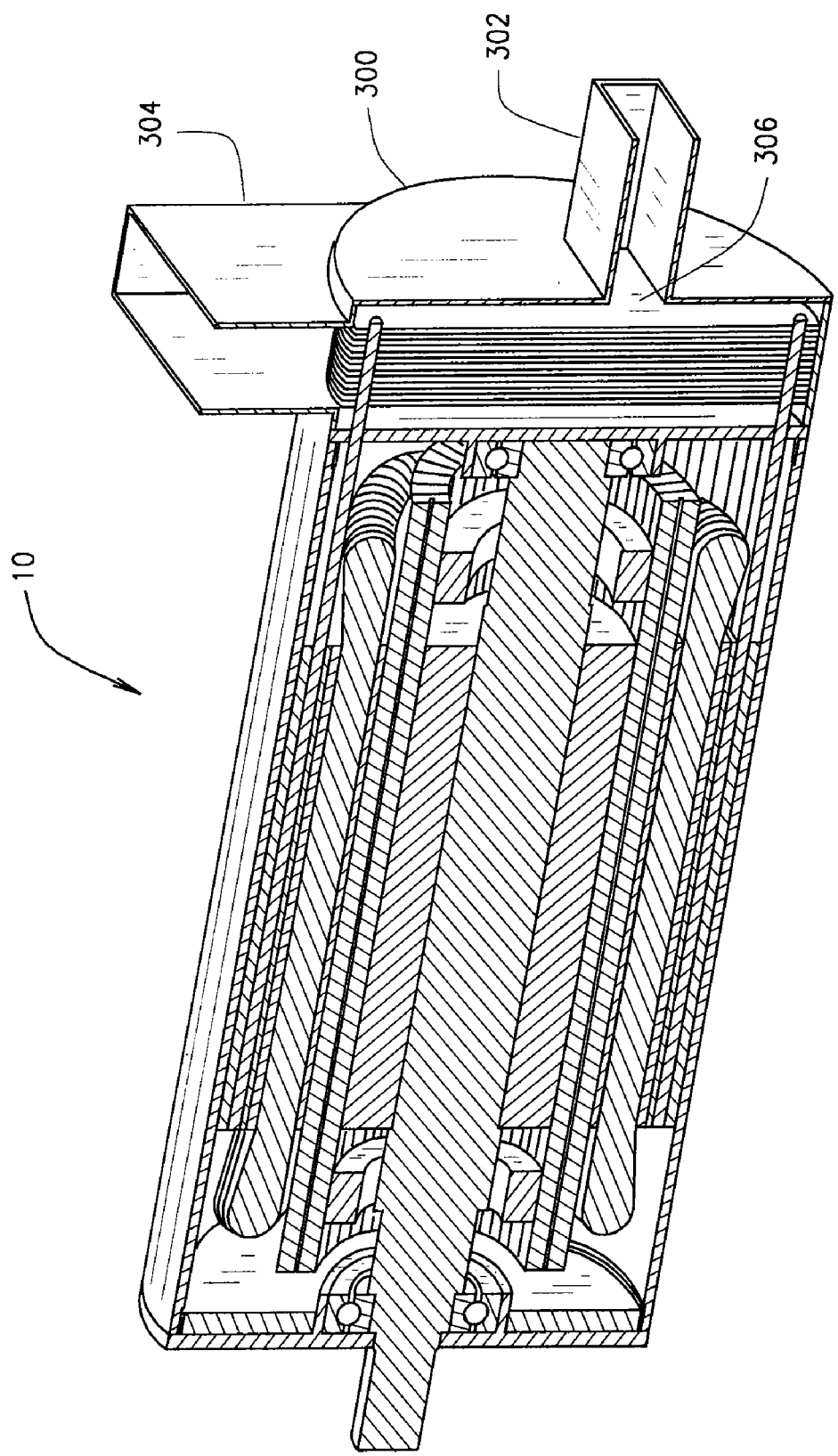
FIG. 13 is a cross-sectional perspective view of a motor having heat pipes cooled by ducted air according to an embodiment of the present disclosure.

Referring to FIGS. 12 and 13, heat pipes may be implemented in an air cooled motor. In FIGS. 12 and 13, like numerals represent like features of the prior described embodiments. The motor 10 further includes an air chamber 300 into which heat pipes from the motor 10 (except the heat pipes of the rotor) extend. The air chamber 300 includes an air inlet 302 from which air is ducted to cool the heat pipes and an air outlet 304 through which heated air that has passed over the heat pipes exits. Cooling fins 306 are attached to the heat pipes and provide greater surface through which to extract heat from the heat pipes.

Figure 14:
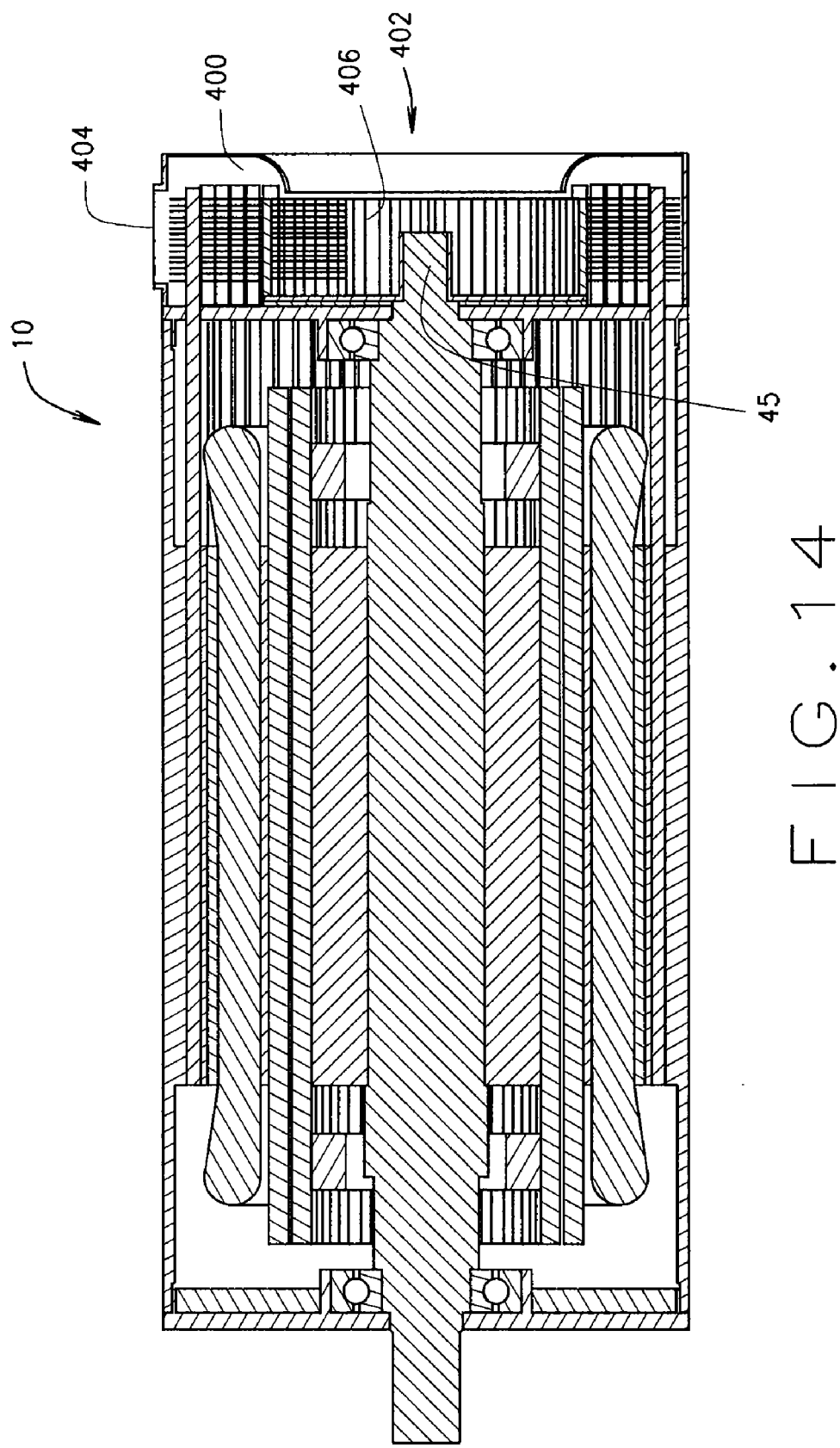
FIG. 14 is a side cross-sectional view of a motor having heat pipes cooled by a fan according to an embodiment of the present disclosure.
Figure 15:
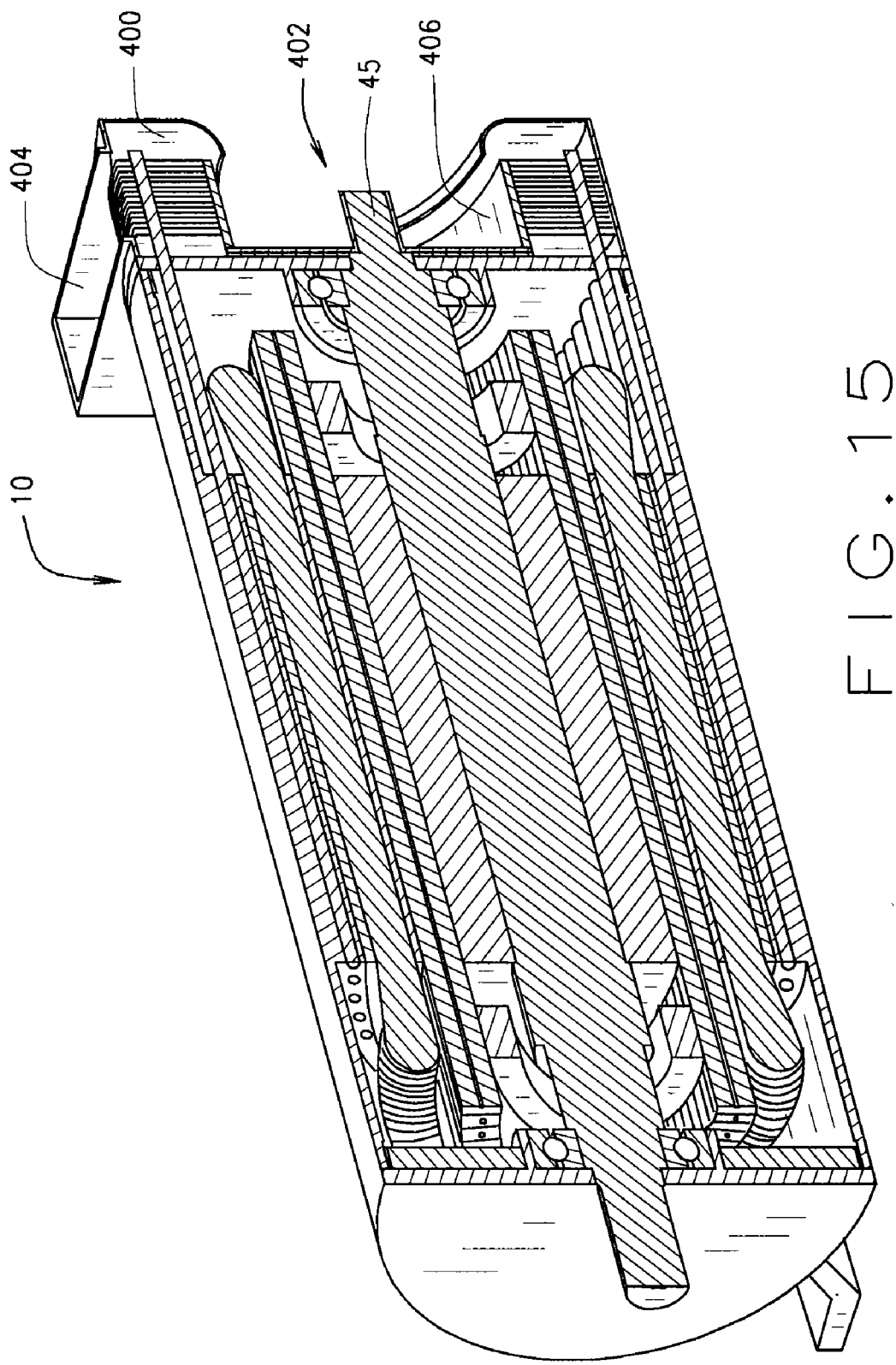
FIG. 15 is a cross-sectional perspective view of a motor having heat pipes cooled by a fan according to an embodiment of the present disclosure.

Referring to FIGS. 14 and 15, heat pipes may be implemented in a fan cooled motor. In FIGS. 14 and 15, like numerals represent like features of the prior described embodiments. The motor 10 further includes an air chamber 400 into which heat pipes from the motor 10 (except the heat pipes of the rotor) extend. The air chamber 400 includes an air inlet 402 from which air is ducted to cool the heat pipes and an air outlet 404 through which heated air that has passed over the heat pipes exits. A fan 406 attached to the shaft 45 forces air from the air inlet 402 to the air outlet 404 over the heat pipes. Cooling fins 408 are attached to the heat pipes and provide greater surface through which to extract heat from the heat pipes.

Figure 16:
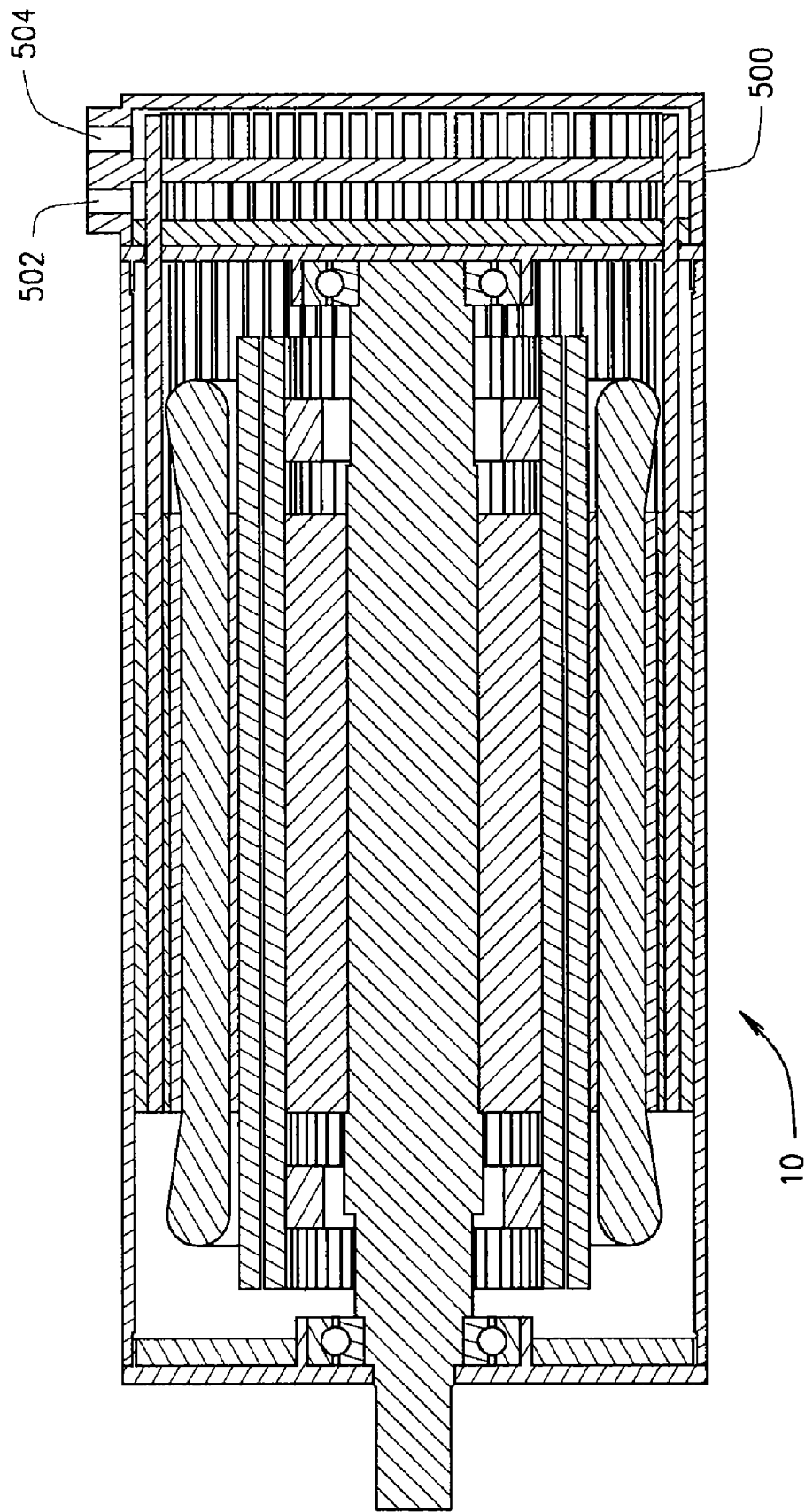
FIG. 16 is a side cross-sectional view of a motor having heat pipes cooled by liquid according to an embodiment of the present disclosure.
Figure 17:
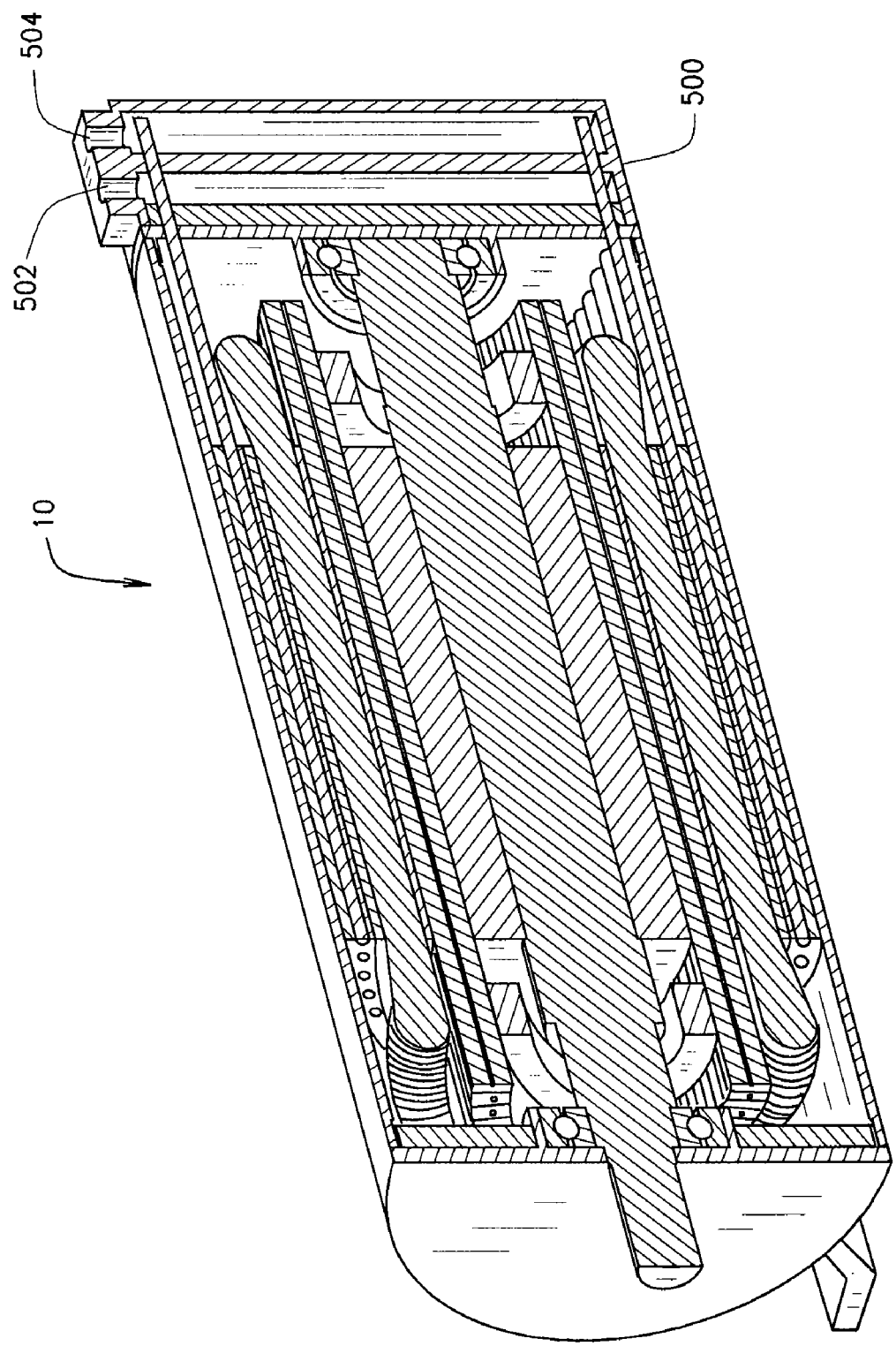
FIG. 17 is a cross-sectional perspective view of a motor having heat pipes cooled by liquid according to an embodiment of the present disclosure.

The heat pipes of the motor 10 may also be cooled by a liquid-based coolant, for example water or ethylene-glycol/water combinations. In FIGS. 16 and 17, like numerals represent like features of the prior described embodiments. The motor 10 further includes a coolant chamber 500. The heat pipes of the motor, except the heat pipes of the rotor, extend into the coolant chamber 500. The coolant chamber 500 includes a coolant inlet 502 into which coolant is piped and a coolant outlet 504 through which coolant is routed after it has passed over the heat pipes. Cooling fins are not shown in the present embodiment, but one of ordinary skill in the art would recognize based upon the teachings of the prior embodiments that cooling fins may be implemented in this embodiment as well.

While not specifically discussed herein, it is further contemplated that heat pipes may also be installed into the rotor itself to further assist in heat dissipation and also in the center of the motor shaft to assist in shaft cooling, which would be particularly useful in reducing bearing heat. As discussed above, this would be beneficial to all rotor types and not only to copper bar induction motor rotors.

Also while not specifically discussed herein, it is contemplated that the outer motor housing may implement cooling fins, particularly on the exterior of the chamber, as a particular implementation may require.

While not specifically discussed herein, the present disclosure may be implemented in all types of electric motors. It is therefore not narrowly limited to induction motors or synchronous motors, but may be used in motors of all types (alternating current (synchronous, induction, permanent magnet, etc.) and direct current motors) all motor voltages (low voltage (less than 600 volt), medium voltage (2300/4000/6600 volt) or high voltage (above 6600 volt) can be used with single-phase and three phase motors, all motor enclosures (e.g. totally enclosed fan cooled, totally enclosed submersible, open motors (WPI/WPII), hermetic motors, etc.) all rotor types (fabricated copper bar, fabricated aluminum, die cast aluminum, permanent magnet, wound rotor, etc.), super conducting motors, and motors of constant or variable speed.

The above examples show that the present disclosure has far ranging application and should not be limited merely to the embodiments shown and described in detail. The specification is provided merely as an example and the scope of the disclosure is not so limited.

We claim:

1. An electric motor comprising:
   a motor portion comprising a stator and a rotor that when energized with electric current, the rotor is caused to rotate by a resulting magnetic field, wherein the motor portion comprises a motor frame that encloses the rotor and stator from exterior elements;
   a cooling portion adjacent the motor portion and separated from the motor portion by a structural interface, the cooling portion comprising:
      a cooling chamber filled with a quantity of motor cooling fluid that is prevented by the structural interface from entering an interior of the motor portion; and
      a mounting plate structured to provide a sidewall of the cooling chamber such that the motor cooling fluid within the cooling chamber of the motor contacts the mounting plate, the mounting plate structured to have a pumping device, driven by the motor, mounted thereto such that a pump medium pumped by the pumping device thermally contacts and cools the mounting plate such that the mounting plate provides an infinite cold plate operable to cool the motor cooling fluid within the cooling chamber of the motor; and
   a plurality of heat pipes disposed within the motor portion and extending from the motor portion into the cooling chamber such that the motor cooling fluid, cooled by the mounting plate that is cooled by the pump medium, contacts the portion of heat pipes extending within the cooling chamber in order to remove heat from the heat pipes.

2. The electric motor of claim 1 wherein the stator defines a plurality of slots, the slots open at an end thereof and the plurality of heat pipes inserted in the plurality of slots and extending through the open end into the cooling chamber.

3. The electric motor of claim 2 wherein a second plurality of heat pipes contact the rotor and extend from within the rotor.

4. The electric motor of claim 3 wherein the rotor defines a plurality of rotor slots with two rotor bar portions inserted into each rotor slot with a heat pipe disposed between each of the rotor bar portions.

5. The electric motor of claim 3 wherein the rotor defines a plurality of rotor slots with a rotor bar portion inserted into each rotor slot with a heat pipe disposed adjacent to the rotor bar portion.

6. The electric motor of claim 3 wherein the rotor defines a plurality of rotor slots with a rotor winding inserted into each rotor slot with a heat pipe disposed adjacent to the rotor winding.

7. The electric motor of claim 1 wherein the rotor defines a plurality of bores in the rotor, the bores having heat pipes disposed therein.

8. The electric motor of claim 1 wherein the heat pipes contact a motor frame along a portion thereof and extend into the cooling chamber at an end thereof.

9. The electric motor of claim 1 wherein the heat pipes contact a back iron ring along a portion thereof and extend into the cooling chamber at an end thereof.

10. The electric motor of claim 1 wherein the heat pipes contact a stator core through bores formed in the stator core along a portion of the heat pipe and an end of the heat pipe extends into the cooling chamber.

11. The electric motor of claim 1 wherein the motor cooling fluid is air and further comprising a fan for forcing the air from an air inlet over the heat pipes and through an air outlet.

12. The electric motor of claim 1 wherein the motor cooling fluid is a liquid coolant.

13. The electric motor of claim 12 wherein the motor cooling fluid is delivered through a coolant inlet and exits through a coolant outlet.

14. The electric motor of claim 12 wherein the motor cooling fluid is water based coolant.

15. The electric motor of claim 14 wherein the motor cooling fluid is delivered through a coolant inlet and exits through a coolant outlet.

16. The electric motor of claim 14 wherein the motor cooling fluid is an oil-based coolant.

17. The electric motor of claim 12 wherein the motor cooling fluid is prevented from exiting the cooling chamber.

18. The electric motor of claim 2 wherein the heat pipes are disposed at a base of the slot and copper windings are placed within the slot over the heat pipe.

19. The electric motor of claim 1 wherein the heat pipes are sealed within the structural interface between the motor portion and the cooling portion to prevent the fluid from the cooling portion from entering the motor portion.

20. The electric motor of claim 19 wherein the heat pipes are sealed within the structural interface between the motor portion and the cooling portion with seals.

21. The electric motor of claim 20 wherein seals are inserted in counterbores in the structural interface to seal the heat within the structural interface.

22. The electric motor of claim 21 further comprising a heat pipe clamp plate that is adapted to maintain the seals in a sealing arrangement with both the structural interface and the heat pipes to prevent the fluid from exiting the cooling chamber.

23. The electric motor of claim 19 wherein the heat pipes are sealed within the structural interface between the motor portion and the cooling portion through mechanical contact of the structural interface.

24. The electric motor of claim 23 wherein the mechanical connection is made by one of the group consisting solder, epoxy or braze filler.

25. A totally enclosed electric motor comprising:
a motor portion comprising a stator and a rotor that when energized with electric current, the rotor is caused to rotate by a resulting magnetic field, wherein the motor portion comprises a motor frame that encloses the rotor and stator from exterior elements;
a cooling portion adjacent the motor portion and separated from the motor portion by a structural interface, the cooling portion comprising:
a cooling chamber filled with a quantity of motor cooling fluid that is prevented by the structural interface from entering an interior of the motor portion; and
a mounting plate structured to provide a sidewall of the cooling chamber such that the motor cooling fluid within the cooling chamber of the motor contacts the mounting plate, the mounting plate structured to have a pumping device, driven by the motor, mounted thereto such that a pump medium pumped by the pumping device thermally contacts and cools the mounting plate such that the mounting plate provides an infinite cold plate operable to cool the motor cooling fluid within the cooling chamber of the motor;
a plurality of heat pipes disposed within the motor portion and extending from the motor portion into the cooling chamber such that the motor cooling fluid, cooled by the mounting plate that is cooled by the pump medium, contacts the portion of the heat pipes extending within the cooling chamber in order to remove heat from the heat pipes; and
a plurality of seals disposed between the heat pipes and the structural interface to prevent the motor cooling fluid from entering the interior of the motor portion.

26. The electric motor of claim 25 wherein the stator defines a plurality of slots, the slots open at an end thereof and the plurality of heat pipes inserted in the plurality of slots and extending through the open end into the cooling chamber.

27. The electric motor of claim 26 wherein a second plurality of heat pipes contact the rotor and extend from within the rotor within the motor chamber.

28. The electric motor of claim 27 wherein the rotor defines a plurality of rotor slots with two rotor bar portions inserted into each rotor slot with a heat pipe disposed between each of the rotor bar portions.

29. The electric motor of claim 27 wherein the rotor defines a plurality of rotor slots a rotor bar portion inserted into each rotor slot with a heat pipe disposed adjacent to the rotor bar portions.

30. The electric motor of claim 27 wherein the rotor defines a plurality of rotor slots with a rotor winding inserted into each rotor slot with a heat pipe disposed adjacent to the rotor winding.

31. The electric motor of claim 26 wherein the rotor defines a plurality of bores in the rotor, the bores having heat pipes disposed therein.

32. The electric motor of claim 25 wherein the heat pipes contact a motor frame along a portion thereof and extend into the cooling chamber at an end thereof.

33. The electric motor of claim 25 wherein the heat pipes contact a back iron ring along a portion thereof and extend into the cooling chamber at an end thereof.

34. The electric motor of claim 25 wherein the heat pipes contact a stator core through bores formed in the stator core along a portion of the heat pipe and an end of the heat pipe extends into the cooling chamber.

35. The electric motor of claim 25 wherein the motor cooling fluid is a liquid coolant.

36. The electric motor of claim 34 wherein the motor cooling fluid is an oil-based coolant.

37. The electric motor of claim 25 wherein the seals are inserted in counterbores in the structural interface to seal the heat pipes to the structural interface.

38. The electric motor of claim 25 further comprising a heat pipe clamp plate that is adapted to maintain the seals in a sealing arrangement with both the heat pipes and the structural interface to prevent the fluid from exiting the cooling chamber.

39. An electric motor comprising:
a motor portion comprising a stator and a rotor that when energized with electric current, the rotor is caused to rotate by a resulting magnetic field, wherein the motor portion comprises a motor frame that encloses the rotor and stator from exterior elements;
a cooling portion adjacent the motor portion and separated from the motor portion by a structural interface, the cooling portion comprising:
a cooling chamber filled with a quantity of motor cooling fluid that is prevented by the structural interface from entering an interior of the motor portion, the cooling portion receiving a supply of the motor cooling fluid from a fluid inlet and expelling the motor cooling fluid from a fluid outlet; and
a mounting plate structured to provide a sidewall of the cooling chamber such that the cooling fluid within the cooling chamber of the motor contacts the mounting plate, the mounting plate structured to have a pumping device, driven by the motor, mounted thereto such that a pump medium pumped by the pumping device thermally contacts and cools the mounting plate such that the mounting plate provides an infinite cold plate operable to cool the cooling fluid within the cooling chamber of the motor; and
a plurality of heat pipes disposed within a back iron ring disposed between the motor frame and the stator and extending from the motor portion to the cooling chamber such that the motor cooling fluid, cooled by the mounting plate that is cooled by the pump medium, contacts the portion of the heat pipes extending within the cooling chamber in order to remove heat from the heat pipes.

40. The electric motor of claim 39 wherein the stator defines a plurality of slots, the slots open at an end thereof and the plurality of heat pipes inserted in the plurality of slots and extending through the open end into the cooling chamber.

41. The electric motor of claim 40 wherein a second plurality of heat pipes contact the rotor and extend from within the rotor.

42. The electric motor of claim 41 wherein the rotor defines a plurality of rotor slots with two rotor bar portions inserted into each rotor slot with a heat pipe disposed between each of the rotor bar portions.

43. The electric motor of claim 41 wherein the rotor defines a plurality of rotor slots a rotor bar portion inserted into each rotor slot with a heat pipe disposed adjacent to the rotor bar portions.

44. The electric motor of claim 41 wherein the rotor defines a plurality of rotor slots with a rotor winding inserted into each rotor slot with a heat pipe disposed adjacent to the rotor winding.

45. The electric motor of claim 41 wherein the rotor defines a plurality of bores in the rotor, the bore having heat pipes disposed therein.

46. The electric motor of claim 39 wherein the heat pipes contact a motor frame along a portion thereof and extend into the cooling chamber at an end thereof.

47. The electric motor of claim 39 wherein the heat pipes contact a back iron ring along a portion thereof and extend into the cooling chamber at an end thereof.

48. The electric motor of claim 39 wherein the heat pipes contact a stator core through bores formed in the stator core along a portion of the heat pipe and an end of the heat pipe extends into the cooling chamber.

49. The electric motor of claim 39 wherein the motor cooling fluid is air and the motor further comprising a fan for forcing the air from the fluid inlet over the heat pipes and into the fluid outlet.

50. The electric motor of claim 39 wherein the motor cooling fluid is a liquid coolant.

51. The electric motor of claim 48 wherein the motor cooling fluid is water based coolant.

52. The electric motor of claim 40 wherein the heat pipes are disposed at a base of the slot and copper windings are placed within the slot over the heat pipe.

53. The electric motor of claim 39 wherein the heat pipes are sealed within the structural interface to prevent the fluid from the cooling portion from entering the motor chamber.

54. The electric motor of claim 53 wherein the heat pipes are sealed within the structural interface with seals.

55. The electric motor of claim 54 wherein the seals are inserted in counterbores in the structural interface to seal the heat pipes to the structural interface.

56. The electric motor of claim 55 further comprising a heat pipe clamp plate that is adapted to maintain the seals in a sealing arrangement with both the structural interface and the heat pipes to prevent the motor cooling fluid from exiting the cooling chamber.

57. The electric motor of claim 53 wherein the heat pipes are sealed within the structural interface through mechanical contact of the heat pipe to the structural interface.

58. The electric motor of claim 57 wherein the mechanical connection is made by one of the group consisting solder, epoxy or braze filler.

59. A method for cooling an electric motor, said method comprising:
providing a motor, the motor including:
a motor portion operable to drive a mechanical device operable to pump a pump medium;
a cooling portion separated from the motor portion by a structural interface; and
a plurality of heat pipes disposed within a back iron ring disposed between the stator and the frame, the heat pipes having evaporator ends disposed within the motor portion and condenser ends disposed within the cooling portion; and
cooling the condenser ends of the heat pipes utilizing the pump medium pumped by the mechanical device driven by the motor portion.

* * * * *